United States Patent [19]

Wells et al.

[11] 4,443,573

[45] Apr. 17, 1984

[54] ADDITIVE DISPERSIONS AND PROCESS FOR THEIR INCORPORATION WITH FIBER-FORMING POLYMERS

[75] Inventors: Rodney L. Wells, Chester; Monty L. Rowe, Midlothian, both of Va.

[73] Assignee: Allied Corporation, Morris Township, Morris County, N.J.

[21] Appl. No.: 375,520

[22] Filed: May 6, 1982

Related U.S. Application Data

[63] Continuation-in-part of Ser. No. 254,349, Apr. 15, 1981, abandoned.

[51] Int. Cl.$^3$ .................................................. C08K 5/10
[52] U.S. Cl. ............................... 524/308; 524/310; 524/311
[58] Field of Search ..................... 524/310, 311, 308

[56] References Cited

U.S. PATENT DOCUMENTS

| | | | |
|---|---|---|---|
| 2,708,173 | 5/1955 | Greenhalgh et al. | 117/232 |
| 2,860,382 | 11/1958 | Garrett | 524/311 |
| 2,862,961 | 12/1958 | Goreau | 524/310 |
| 2,975,152 | 3/1961 | Hurwitz et al. | 524/356 |
| 3,282,971 | 11/1966 | Metro et al. | 560/263 |
| 3,516,957 | 6/1970 | Gray et al. | 524/399 |
| 4,053,540 | 10/1977 | Argurio et al. | 526/5 |
| 4,085,080 | 4/1978 | Elbert | 524/311 |
| 4,169,819 | 10/1979 | Shiohara | 524/311 |
| 4,220,570 | 9/1980 | Loffelholz et al. | 525/239 |
| 4,274,987 | 6/1981 | Augustyn | 524/425 |

*Primary Examiner*—Paul R. Michl

[57] ABSTRACT

Dispersions and process for their incorporation with a synthetic fiber-forming polymer are provided. The dispersions comprise a polymer additive, such as titanium dioxide, and a carrier of either a $C_5$–$C_{26}$ fatty acid ester of pentaerythritol or a $C_5$–$C_{26}$ fatty acid ester of dipentaerythritol.

15 Claims, No Drawings

ADDITIVE DISPERSIONS AND PROCESS FOR THEIR INCORPORATION WITH FIBER-FORMING POLYMERS

This is a continuation-in-part of Ser. No. 254,349, filed Apr. 15, 1981, now abandoned.

BACKGROUND OF THE INVENTION

1. Field of the Invention

The present invention relates to dispersions for incorporation with a synthetic fiber-forming polymer and to improved processes for melt-spinning yarn from a fiber-forming polymer. More particularly the present invention relates to dispersions of polymer additives, especially titanium dioxide particles to control fiber luster and dyes to color the yarn, and a carrier of either a fatty acid ester of pentaerythritol or a fatty acid ester of dipentaerythritol.

2. Description of the Prior Art

In spinning highly viscous synthetic polymers such as polyamides and polyesters, it is common to incorporate additives in order to obtain required characteristics of the final polymer for specific end uses. Many such additives are known and utilized to control dyeing, static, luster, flammability, light stability, brightness, etc. A particularly preferred additive is titanium dioxide, used to decrease the luster of the resulting fiber spun from the molten polymer through conventional techniques and equipment such as a filter, spin pot, spinnerette, quench stack and take-up equipment or winder.

These additives can be incorporated in a variety of ways. In a conventional melt-spinning process starting with fiber-forming polymer chips, the additives can be added initially with the monomeric components and mixed during polymerization, or the additives can be used to coat the polymer chips. See, for example, U.S. Pat. No. 3,673,147 to Bor, hereby incorporated by reference. In both the conventional and continuous melt-spinning processes, it should be desirable to add the additives to the process stream at a point where the polymer is molten by continuously injecting a dispersion comprising the additive and a carrier into the polymer melt prior to spinning. In this manner the concentration of additive could readily be varied without a lengthy polymer transition. Further, additive agglomerates generated during polymerization would be eliminated or decreased.

Polybutene has been successfully used as a carrier for injection of organic copper stabilizers for nylon (see U.S. Pat. No. 4,061,708 to Lazarus et al., hereby incorporated by reference) and as a carrier for injection of organic copper stabilizers and titanium dioxide for polyester (see U.S. Pat. No. 4,070,342 to Lazarus et al., hereby incorporated by reference).

Unfortunately, the high temperature and pressure conditions experienced subsequent to injection cause some polybutenes to boil and vaporize; if flashed to the atmosphere, the polybutene could be condensed and collected as a contaminated oil. Also, some polybutenes separate from the pigment when exposed to high polymer melt temperature. In order to avoid this problem, the present invention was developed.

It is believed the closest prior art in U.S. Pat. Nos. 3,833,542 to Lazarus et al.; 3,956,008 to Knepper et al.; 4,061,708 to Lazarus et al.; and 4,070,342 to Lazarus et al.

SUMMARY OF THE INVENTION

The present invention provides dispersions for incorporation with a synthetic fiber-forming polymer and improved processes for melt-spinning yarn from a fiber-forming polymer. The preferred fiber-forming polymers are synthetic linear condensation polymers, especially polyamide and polyester, prepared for example, in accordance with U.S. Pat. Nos. 2,130,523 (polyamide) and 2,465,319 to Whinfield et al. and 2,901,466 to Kibler et al. (polyester), all of which are hereby incorporated by reference.

In one embodiment, the dispersion for incorporation with polyamide polymer comprises: (a) 20 to 80, more preferably 30 to 50, weight percent of at least one polymer additive having an average diameter of up to 0.5 micron at spinning temperature; and (b) 20 to 80, more preferably 50 to 70, weight percent of a $C_5$ through $C_{26}$, more preferably $C_5$ through $C_{18}$, most preferably, $C_8$ through $C_{10}$, fatty acid ester of pentaerythritol. In an alternate embodiment, constituent (b) of the dispersion is 20 to 80, more preferably 50 to 70, weight percent of a $C_5$ through $C_{26}$, more preferably $C_5$ through $C_{18}$, most preferably $C_5$ through $C_{10}$, fatty acid ester of dipentaerythritol. The most preferred polyamide is nylon 6.

The dispersion for incorporation with polyester polymer comprises: (a) 20 to 80, more preferably 30 to 50, weight percent of at least one polymer additive having an average diameter of up to 0.5 micron at spinning temperature; and (b) 20 to 80, more preferably 50 to 70, weight percent of a $C_5$ through $C_{26}$, more preferably $C_5$ through $C_{18}$, most preferably $C_8$ through $C_{10}$ fatty acid ester of pentaerythritol. In an alternate embodiment, constituent (b) of the dispersion is 20 to 80, more preferably 50 to 70, weight percent of a $C_5$ through $C_{26}$, more preferably $C_5$ through $C_{18}$, most preferably $C_5$ through $C_{10}$, fatty acid ester of dipentaerythritol.

For polyamide polymer, the spinning temperature preferably ranges from 255° C. to 285° C., whereas for polyester polymer the spinning temperature preferably ranges from 260° C. to 320° C. In either event, the additive may either be liquid or solid at spinning temperature.

The present invention also provides a fiber-forming polymer, preferably polyamide or polyester, having incorporated therein up to about 10 weight percent, preferably 0.16 to 2.5 weight percent, of a dispersion comprising (a) 20 to 80, more preferably 50 to 70, weight percent of at least one polymer additive having an average diameter of up to 0.5 micron at spinning temperature; and (b) 20 to 80, more preferably 50 to 70, weight percent of a $C_5$–$C_{26}$, more preferably $C_5$–$C_{18}$, most preferably $C_8$–$C_{10}$, fatty acid ester of pentaerythritol. In an alternate embodiment, constituent (b) of the dispersion is a $C_5$–$C_{26}$, more preferably $C_5$–$C_{18}$, most preferably $C_5$–$C_{10}$, fatty acid ester of dipentaerythritol.

The Brookfield viscosity of the dispersion at 25° C., 30 rpm, #3 spindle, ranges from 500 to 8000, more preferably from 1000 to 3000, centipoises.

Pigments that can be used in the invention for coloring the fiber include those of organic nature which will either enhance or maintain the lightfastness obtained by solution dyeing skeins of the yarn. Inorganic pigments that can be used are, for example, titanium dioxide, carbon black, metal powders, iron oxide, ultramarine, lead chromate, etc. Mixtures of two or more pigments and/or additives can, of course, be used. The pigment/additive must be stable to the heat used in the spinning process. A particularly preferred additive is titanium dioxide either in rutile or anatase crystallographic form. Anatase titanium dioxide is the preferred form for delustering synthetic fibers because it is softer than rutile, thereby giving lower abrasiveness in yarn processing equipment. Commercial varieties of titanium dioxide are often surface treated with alumina or silica to improve performance. The preferred titanium dioxide additive is UNITANE 0-310 (American Cyanamid) which has specific gravity 3.8, refractive index 2.55 and approximate pH 7.3 with aluminum oxide additive. As stated previously, the additive may be either liquid or solid at spinning temperature. If solid, the longest measurable dimension of the particle is its average diameter, the preferred average diameter being 0.1 to 0.5 micron, most preferably 0.2 micron or less.

It is preferred that the dispersion further comprise about 0.25 to 2.5 percent, most preferably about 1 percent, based on the weight of the additive, of a compatible surfactant. By way of example, but not intended to be all-inclusive, are the following surfactants: some vegetable oils such as soybean oil and soya lecithin, a complex mixture of phosphatidyl choline, phosphatidyl ethanol amine and phosphoinositides; cocomethyl polyoxyethyl (15) ammonium chloride; tallow amine; polyethoxylated amines, for example, polyethoxylated (50) stearyl amine, polyethoxylated (5) tallow amine and N,N-polyoxyethyl (15) octadecyl amine; an amine-fatty acid salt such as N-tallow-1,3-diamino-propane dioleate; a polyethylene glycol ester, e.g., polyethylene glycol (5) coco fatty acid ester; ethoxylated amides, e.g., polyethoxylated (5) oleoamide, ethoxylated coconut fatty acid monoethanol amide; a fatty amide, e.g., hydrogenated tallow amide; aluminum stearate; a polyglycol such as a polyoxyethylene-polyoxypropylene condensate; salts of phosphate and sulfonate esters in aqueous or organic solvents; and modified polyester in a solvent. The surfactant functions as a slurry stabilizer. It helps in forming the dispersion by lowering the surface energy.

The dispersion may further comprise, in lieu of a surfactant preferably, an organic titanate. When used, the organic titanate preferably forms 0.01 to 5.0, more preferably 0.5 to 0.25, weight percent of the dispersion. Organic titanates are preferably added to the carrier and mixed thoroughly, followed by mixing of the additives. The organic titanates enhance the coating of the additive particles with the carrier and thus in effect reduce the dispersion viscosity for a given solids content, allowing higher additive particle concentrations without prohibitively high viscosity. The preferred organic titanate has the general structure:

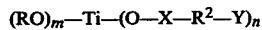
$(RO)_m—Ti—(O—X—R^2—Y)_n$ wherein R is monoalkoxy or chelate;

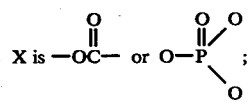
X is $-O\overset{O}{\underset{\|}{C}}-$ or $O-\overset{O}{\underset{\underset{O}{\diagdown}}{\overset{\|}{P}\diagup}}^{O}$ ;

$R^2$ is dioctyl or isoheptadecyl; Y is H; m is 1; and n is 2 or 3.

It is preferred that the organic titanate be selected from the group consisting of isopropyl, tri(dioctylphosphato) titanate; isopropyl, triisostearoyl titanate; and di(dioctylphosphato) ethylene titanate.

The present invention also provides improved processes for melt-spinning yarn from fiber-forming polyamide and polyester polymers. The process is comprised of adding to the specified polymer prior to spinning of filaments of the polymer the dispersions as set forth previously. The dispersion may be added to the polymer when the polymer is in chip form, e.g., at the extruder throat, which is preferred, or when the polymer is molten, e.g., at the barrel (vent port) of the extruder after final polymerization of polycondensation of the polymer.

When the polymer additive is titanium dioxide, it is preferred that a sufficient amount of the dispersion be incorporated that up to 2 percent titanium dioxide on the weight of the fiber be added.

The weight percent of the dispersion incorporated with the fiber-forming polymer is determined by dividing the weight percent of the dispersion additives in the yarn by the weight percent of the dispersion additives in the dispersion.

DETAILED DESCRIPTION OF THE INVENTION

The preferred dispersion of the present invention is incorporated with nylon-6 or polyethylene terephthalate and comprises 30 to 50, most preferably 37.5, weight percent titanium dioxide having an average diameter of about 0.2 micron or less at spinning temperature; 0.075 to 0.75, most preferably 0.375, weight percent soya lecithin; and 50 to 70, most preferably 62.125, weight percent of a $C_8$–$C_{10}$ fatty acid ester of pentaerythritol or a $C_5$–$C_{10}$ fatty acid ester of dipentaerythritol. An alternate but equally preferred dispersion comprises 30 to 50, most preferably 50, weight percent titanium dioxide having an average diameter of about 0.2 micron or less at spinning temperature; 0.05 to 0.25, most preferably 0.25, weight percent of an organic titanate selected from the group consisting of isopropyl, tri(dioctylphosphato) titanate, di(dioctylphosphato)ethylene titanate and isopropyl, triisostearoyl titanate; and 50 to 70, most preferably 50, weight percent of a $C_8$–$C_{10}$ fatty acid ester of pentaerythritol or a $C_5$–$C_{10}$ fatty acid ester of dipentaerythritol. The injection rate is dependent on the desired level of titanium dioxide in the final product, which may be up to 2 weight percent, but preferably ranges from about 0.13 to 0.50 weight percent. Preferably, the dispersion is injected via the extruder vent port into the molten polymer stream at a velocity of not less than 0.5 ft/s (0.2 m/s) to prevent pluggage at the injection point. Static mixers are used to ensure good in-polymer dispersion and minimum titanium dioxide agglomeration. The residence time between the injection point and mixer is usually less than a minute. The chip-fed and melt-fed processes are equally preferred. In the chip-fed extrusion process the percent polymer which is molten preferably is greater than 50, most preferably greater than 65, to prevent extruder screw slippage and potential screw bridges.

Certain tests utilized in illustrating this invention are defined as follows.

Determination of Carboxyl End Groups of Nylon

1. Weight 2.0 g (to nearest tenth of a milligram) of undrawn, finish-free yarn into a clean, dry 125 ml Erlenmeyer flask.
2. Add 50 ml benzyl alcohol.
3. Heat on hot plate to 180°–190° C. until sample dissolves. Do not let the benzyl alcohol boil.

4. Remove flask from hot plate, cool to about 120° C., add 3 to 5 drops of phenolphthalein indicator, and titrate with standard N/20 potassium hydroxide in benzyl alcohol. Record volume of titrant used.
5. Calculate carboxyl end groups using:

$$C = \frac{(V_s - V_b) \times N \times 1000}{W}$$

where
C = carboxyl end groups, in microequivalents/g,
$V_s$ = volume of titrant to titrate sample, in ml,
$V_b$ = volume of titrant to titrate blank, in ml,
N = normality of titrant, and
W = sample weight, in grams.

Note: Each day that end groups are analyzed, determine a blank on the benzyl alcohol. Add 3 to 5 drops of phenolphthalein solution to 50 ml of benzyl alcohol. Titrate with N/20 potassium hydroxide in benzyl alcohol to the first faint pink color which persists for 30 seconds while swirling the flask. If the blank is greater than 0.2 ml, reject the bottle of benzyl alcohol and use a fresh bottle.

Determination of Amine End Groups of Nylon-6

1. Weight 2.0 g (to nearest tenth of a milligram) of undrawn, finish-free yarn into a clean, dry 125 ml Erlenmeyer flask.
2. Add 50 ml phenol-methanol mixed solvent, 68% phenol content, using automatic pipet, and stopper the flask.
3. Using wrist-action shaker, shake sample until solution is complete, approximately 30 minutes.
4. Add four drops of mixed green indicator (0.1 weight-/volume percent Methyl Yellow and 0.1 weight-/volume percent Methylene Blue in methanol), and titrate with 0.01 N p-toluenesulfonic acid solution in methanol to change of color from green to gray.
5. Calculate amine end groups using:

$$A = \frac{V \times N \times 1000}{W}$$

where
A = amine end groups in microequivalents/g,
V = volume of titrant, in ml,
N = normality of titrant, and
W = sample weight, in grams.

In order to illustrate the present invention, the following examples are given. Parts and percentages employed are by weight unless otherwise indicated.

EXAMPLE 1 (COMPARATIVE)

Nylon 6 polymer pellets having the characteristics designated in Table 1 and having a titanium dioxide level of about 0.52 percent (a 47 percent aqueous titanium dioxide prior art dispersion had been added to caprolactam with other additives and catalysts at the start of polymerization) were melted at about 260° to 265° C. and melt extruded under pressure of about 1000 psig (6895 kPa) through a 144-orifice (asymmetrical, Y-shaped) spinnerette at a rate of 134 pounds per hour (60.8 kg/hr) into a quench stack where the cross flow of quenching fluid was air at a temperature of about 15.6° C. and at a relative humidity of about 65 percent. The quenched filaments had a spin finish applied at 5.5 percent wet pickup and subsequently were taken up. The modification ratio was 2.4. The yarn was then drawn at a mechanical draw ratio of 3.0. The yarn of this example is considered the control for Examples 1-5. See Tables 1 through 3 for polymer properties, spinning conditions and physical yarn properties, respectively.

EXAMPLES 2 AND 3

The procedure of Example 1 was repeated in Examples 2 and 3, utilizing nylon 6 polymer pellets having the characteristics designated in Table 1 and a titanium dioxide level of about 0.13±0.02 percent. In both examples a dispersion comprising 39.4 weight percent finely divided titanium dioxide sold as UNITANE 0-310 (American Cyanamid Company, specific gravity 3.8, approximate pH 7.3 with aluminum oxide additive), 0.394 weight percent YELKIN DS (Ross & Rowe, Inc., a soybean lecithin of mixed phosphatidyl choline, phosphatidyl ethanolamine and phosphoinositides), and 60.206 weight percent ETHOX 2140 (Ethox Chemicals, Inc., pentaerythritol tetraester $C_8$–$C_{10}$ acids having a viscosity at 25° C., 30 rpm, #2 spindle, of 48 cps, flashpoint of about 276° C., specific gravity at 15.6° C. of 0.936) was formed by adding the powdered titanium dioxide to the carrier containing lecithin over a one-half hour period with a Manton-Gaulin Varikinetic Mixer. The dispersion remained fluid throughout the addition period. The final dispersion density and Brookfield viscosity at 25° C. were, respectively, 1.3 g/cc and 1170 cps, 30 rpm, #3 spindle. In Example 2, the dispersion was injected in the vent port of the extruder while in Example 3, injection was in the feed throat of the extruder. Note that at the extruder feed throat, the polymer is in chip form while at the extruder vent port the polymer is molten; therefore, when injecting at the extruder vent port, pressure must be used to inject the dispersion in order to overcome the pressure of the polymer or else the polymer will back up into the injection tube. The injection rate was adjusted to yield an undrawn yarn with nominal 0.5 percent titanium dioxide. Examination of undrawn filament length and cross section indicated titanium dioxide distribution was uniform and agglomerates were minor. No visible irregularities were seen along the length or cross-sections of filaments examined under the microscope. Yarn properties and spinning conditions are given in Tables 1–3.

EXAMPLES 4 AND 5

The procedure of Examples 2 and 3 was repeated in Examples 4 and 5, respectively, utilizing nylon 6 polymer pellets having the characteristics designated in Table 1 and a titanium dioxide level of about 0.13±0.02 percent. In Examples 4 and 5, however, the dispersion carrier at 59.297 weight percent was ETHOX 2143 (Ethox Chemicals, Inc., dipentaerythritol hexaester $C_5$–$C_{10}$ acids having a viscosity at 25° C., 30 rpm, #2 spindle, of 81 cps, flash point of about 284° C., specific gravity at 15.6° C. of 1.01). The dispersion also comprised 40.3 and 0.403 weight percent, respectively, of UNITANE 0-310 and YELKIN DS. The final dispersion density and Brookfield viscosity at 25° C. were, respectively, 1.4 g/cc and 2620 cps at 30 rpm, #3 spindle. In Example 4, the dispersion was injected in the vent port of the extruder while in Example 5, injection was in the feed throat. Examination of undrawn filament length and cross-section indicated titanium dioxide distribution was fairly uniform and agglomerates minor. No visible irregularities were seen along the length or in cross-sections of filament examined under the microscope. Polymer properties, spinning conditions and physical yarn properties are presented in Tables 1–3.

EXAMPLE 6

Undrawn yarn produced according to the procedure of Example 1 was converted to a drawn, textured fiber for subsequent processing. The undrawn yarn was fed through a draw zone where it was drawn at a draw ratio of 3.0. The drawn yarn was then continuously fed to a steam jet texturizer operating with steam at a pressure of 68 psig (469 kPa) and at a temperature of 268° C., and subsequently was taken up. Drawn, textured yarn physicals are presented in Table 3.

EXAMPLES 7 THROUGH 9

Undrawn yarn produced according to procedures of Examples 2, 4 and 5 was converted to a drawn, textured fiber for subsequent processing in each of Examples 7, 8 and 9, respectively. The undrawn yarn was fed through a draw zone where it was drawn at a draw ratio of 3.0. The drawn yarn was then continuously fed to the steam jet texturizer operating with steam at a pressure of 68 psig (469 kPa) and at a temperature of 270° C. and subsequently was taken up. Drawn, textured yarn physicals are presented in Table 3.

EXAMPLE 10

A dispersion comprising 298 g ETHOX 2143, 2 g GANEX V-216 (GAF Corporation, alkylated polyvinylpyrolidone having an average molecular weight of about 7300 and specific gravity at 15.6° C. of 0.90) and 200 g UNITANE 0-310 was mixed in an Eppenbach Homomixer. The dispersion had a Brookfield viscosity at 25° C., spindle #5, 20 rpm, of 3600 cps. Fourteen grams of the dispersion were tumbled in a Patterson Kelly twin-shell blender for 30 minutes at room temperature (25° C.) with 1500 g of nylon 6 polymer pellets. In this manner the dispersion was coated on the chips to produce a titanium dioxide level of 0.48 percent. The chips have the characteristics designated in Table 1. The chips were melted at about 280° C. and melt extruded under pressure of about 1600 psig (11032 kPa) through a 14-orifice spinnerette at a rate of about 23 g/min into a quench stack where the cross flow of quenching fluid was air at a temperature of about 15.6° C. and at a relative humidity of about 65 percent. The quenched filaments had a spin finish applied and subsequently were taken up. The modification ratio was targeted for 2.4±0.2, and the undrawn denier was 698. The yarn was then plied and simultaneously fed through a draw zone where it was drawn at a draw ratio of 3.2 to produce drawn yarn having a nominal denier of 2250. The drawn yarn was then continuously fed to a steam jet texturizer operating with steam at a pressure of 68 psig (469 kPa) and at a steam temperature of 268° C. The yarn was skeined, autoclaved at 132.2° C., and knitted into sleeves. Some of the sleeves were dyed Laurel Crest 3707, 3919 or 3805, exposed 40, 60 80 and 100 hours to xenon, and ΔE (Hunter Lab) was determined for each exposure time. Xenon dye lightfastness was measured in accordance with AATCC Test Method 16E-1978 (XRF-1 for 20 AFU). Colorfastness is determined according to the gray scale for color change, AATCC evaluation Procedure 1. Results are presented in the tables.

EXAMPLE 11 (COMPARATIVE)

The procedure of Example 10 was repeated without coating the chips with a dispersion. Undrawn denier of the yarn was 700. The steam jet texturizer operated with steam at a pressure of 69 psig (476 kPa) and at a steam temperature of 269° C. Conditions and results are presented in the tables.

EXAMPLE 12 (COMPARATIVE)

Fifteen hundred (1500) g of nylon 6 polymer pellets having the characteristics designated in Table 1 were melted to form fibers in accordance with the procedure of Example 10, with the following changes. The level of titanium dioxide was 0.14 percent. Melt extrusion pressure was about 1500 psig (10342 kPa), undrawn denier was 715, texturizer steam pressure was 70 psig (483 kPa) and steam temperature was 267° C. The yarn was skeined, autoclaved at 132.2° C. and knitted into sleeves which were tested in accordance with the tests set forth in Example 10. Conditions and results are presented in the tables.

EXAMPLE 13 (COMPARATIVE)

Fifteen hundred (1500) g of nylon 6 polymer pellets having the characteristics designated in Table 1 were melted to form fibers in accordance with the procedure of Example 10, with the following changes. Melt extrusion pressure was about 1400 psig (9653 kPa), undrawn denier was 711, texturizer steam pressure was 70 psig (483 kPa) and steam temperature was 270° C. The yarn was skeined, autoclaved at 132.2° C. and knitted into sleeves which were tested in accordance with the tests set forth in Example 10. Conditions and results are presented in the tables.

EXAMPLES 14 THROUGH 16

The procedure of Example 10 was repeated in each of Examples 14 through 16 with changes as follows.

In Example 14, the dispersion comprised 298 g of ETHOX 2410, 2 g of YELKIN DS and 200 g of UNITANE 0-310. The dispersion had a Brookfield viscosity at 25° C., 20 rpm, #4 spindle, of 1870 cps. Melt extrusion pressure was about 1350 psig (9308 kPa), undrawn denier was 710, texturizer steam pressure was 70 psig (483 kPa) and steam temperature was 268° C.

In Example 15, the dispersion comprised 298 g of ETHOX 2140, 2 g of GANEX V-216 and 200 g of UNITANE 0-310. The dispersion had a Brookfield viscosity at 25° C., 20 rpm, #4 spindle, of 1500 cps. Melt extrusion pressure was about 1500 psig (10342 kPa), undrawn denier was 710, texturizer steam pressure was 68 psig (469 kPa) and steam temperature was 268° C.

In Example 16, 20 g of the dispersion of Example 14 was utilized. Melt extrusion pressure was about 1350 psig (9308 kPa), undrawn denier was 700, texturizer steam pressure was 68 psig (469 kPa) and steam temperature was 268° C.

Conditions and results are presented in the tables.

EXAMPLE 17 (COMPARATIVE)

Nylon 6 polymer having, nominally, 20 carboxyl ends, equivalents per $10^6$ grams polymer, 27 amine ends, equivalents per $10^6$ grams polymer, a formic acid viscosity of 55, and having no titanium dioxide therein is produced in a continuous process, i.e., a process wherein subsequent to final polymerization, the molten polymer is pumped directly to spinning units by an extruder. The molten polymer, having a temperature of about 265° C. is melt-extruded under pressure of about 1000 psig (6895 kPa) through a 144-orifice spinnerette at a rate of 147.5 pounds per hour (66.9 kg/hr) into a quench stack where cross flow of quenching fluid is air at a temperature of about 15.6° C. and at a relative humidity of about 65 percent. The quenched filaments have a spin finish applied at 5.5 percent wet pickup and are deposited in a tow can. The undrawn denier per filament is nominally 44, the modification ratio is 2.4, and the percent finish on yarn is about 1.1. Yarn made in accordance generally with this procedure and from several tow cans is combined in a creel into a tow and stretched in a normal manner at a stretch ratio of about 2.6 to 3.0 in a tow stretcher. The tow is then fed through a stuffing box crimper using 15 pounds of steam (103 kPa) to produce about 11 crimps per inch (4.33 crimps/cm). Then, the tow is fed into a conventional cutter, is cut into staple yarn, has a lubricating overfinish applied (Quadralube L-100 AX, Manufacturers Chemicals Corporation, P.O. Box 197, Cleveland, Tenn. 37311), and is baled.

EXAMPLE 18

The procedure of Example 17 is repeated. A dispersion comprising 39.4 weight percent UNITANE 0-310, 0.394 weight percent YELKIN DS, and 60.206 weight percent ETHOX 2140 is formed as in Examples 2 and 3. The dispersion is injected in the extruder feed line while the polymer is molten. The injection rate is adjusted to yield an undrawn yarn with nominal 0.3 percent titanium dioxide. Subsequent to application of the spin finish, the yarn is deposited in a tow can. The undrawn denier per filament of the yarn is about 44, the modification ratio is about 2.5, and the percent finish on yarn is about 1.1. Subsequently yarn from several tow cans is combined in a creel into a tow and stretched in a normal manner at a stretch ratio of about 2.6 to 3.0 in a tow stretcher. The tow is then fed to a stuffing box crimper using 15 pounds of steam (103 kPa) to produce about 11 crimps per inch (4.33 crimps/cm). Then the tow is fed into a conventional cutter, is cut into staple yarn, has a lubricating overfinish applied, and is baled. Yarn produced according to this example tests satisfactorily when compared with yarn produced by Example 17 for dye lightfastness and colorfastness.

EXAMPLES 19-21

These examples demonstrate the benefits obtained by utilizing an organic titanate in the dispersion to be injected rather than the soya lecithin surfactant. In Example 19, a dispersion comprising 49.5 weight percent UNITANE 0-310 and 50.5 weight percent ETHOX 2140 is mixed in an Eppenbach Homomixer. To the dispersion is added 0.25 weight percent isopropyl, tri(dioctylphosphato) titanate. Twenty grams of the dispersion are tumbled in a Patterson Kelly twin-shell blender for 30 minutes at room temperature (25° C.) with 1800 g of nylon 6 polymer pellets characterized by, typically, 48 carboxyl ends, equivalents per 10⁶ grams polymer, 50 amine ends, equivalents per 10⁶ grams polymer, and 55±3 formic acid viscosity. In this manner, the dispersion is coated on the chips, and the chips have a titanium dioxide level of about 0.5 percent. The chips are melted at about 270° C. and melt extruded under pressure of about 1000 psig (6895 kPa) through a 14-orifice (asymmetrical, Y-shaped) spinnerette at a rate of about 23 g/min into a quench stack where the cross flow of quenching fluid is air at a temperature of about 15.6° C. and at a relative humidity of about 65 percent. The quenched filaments have a spin finish applied and subsequently are taken up. The modification ratio is targeted for 2.4±0.2, and the undrawn denier is about 700. The yarn is then plied and simultaneously fed through a draw zone where it is drawn at a draw ratio of 3.2 to produce drawn yarn having a denier of 2250. The drawn yarn is then continuously fed to a steam jet texturizer operating with steam at a pressure of 70 psig (483 kPa) and at a temperature of 270° C. The yarn is skeined, autoclaved at 132.2° C., and formed into knitted sleeves for further testing. In Example 20, the organic titanate is di(dioctylphosphato)ethylene titanate, and in Example 21, the organic titanate is isopropyl triisostearoyl titanate.

Physical properties of the yarn are not adversely affected by utilizing an organic titanate as specified in lieu of the surfactant.

EXAMPLE 22

An injection dispersion suitable for producing a pigmented fiber is prepared by mixing (Eppenbach high shear mixer) together 59.6 parts ETHOX 2143, 0.4 part YELKIN DS, and 40 parts Meteor Tan 7729 (Harshaw Chemical Co., Cleveland, Ohio), a chromium, antimony titanate of specific gravity at 25° C. of 4.29 (35.8 lbm/gal or 4290 kg/m³). About 0.125 to 0.5 part of the dispersion is injected per 100 parts nylon 6 according to the procedure of Example 3, but in lieu of the dispersion of that example, to produce a light brown fiber, possessing acceptable chemical and physical properties. Further, the feed polymer chips have no titanium dioxide and have the same chemical properties as that of Example 19.

EXAMPLE 23

The procedure of Example 22 is followed except that injection occurs via the extruder vent port. A light brown fiber, possessing acceptable chemical and physical properties, is produced.

EXAMPLES 24-25

An injection dispersion suitable for producing a delustered, pigmented fiber is prepared by mixing (Eppenbach high shear mixer) together 59.6 parts ETHOX 2143, 0.4 part YELKIN DS, 20 parts UNITANE 0-310, and 20 parts Meteor Tan 7729. The procedures of Examples 22 and 23 are followed in, respectively, Examples 24 and 25 to produce a light brown fiber possessing acceptable chemical and physical properties.

TABLE 1

| | POLYMER PROPERTIES | | | | | | | | | | | | | | | |
|---|---|---|---|---|---|---|---|---|---|---|---|---|---|---|---|---|
| | Example | | | | | | | | | | | | | | | |
| Property | 1 | 2 | 3 | 4 | 5 | 6 | 7 | 8 | 9 | 10 | 11 | 12 | 13 | 14 | 15 | 16 |
| Carboxyl ends, milliequivalents per 10⁶ g polymer | 52 | 53 | 50 | 50 | 51 | 52 | 53 | 50 | 51 | 47 | 47 | 47 | 49 | 47 | 46 | 48 |
| Amine ends, milliequivalents per 10⁶ | 50 | 47 | 47 | 49 | 49 | 50 | 47 | 49 | 49 | 44 | 45 | 45 | 46 | 44 | 44 | 46 |

TABLE 1-continued

POLYMER PROPERTIES

| Property | Example | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| g polymer Formic Acid Viscosity[1] | 50 | 54 | 54 | 54 | 56 | 50 | 54 | 54 | 56 | 61 | 63 | 61 | 63 | 58 | 59 | 54 |

[1] ASTM D-789-59T

TABLE 2

SPINNING CONDITIONS

| Condition | Example | | | | | | | |
|---|---|---|---|---|---|---|---|---|
| | 1 | 2 | 3 | 4 | 5 | 6 | 7 | 8 |
| Extruder | | | | | | | | |
| Temperature, °C. | 260 | 260 | 260 | 260 | 260 | 260 | 260 | 260 |
| Pressure, psig/kPa | 1000/6895 | 1000/6895 | 1000/6895 | 1000/6895 | 1000/6895 | 1000/6895 | 1000/6895 | 1000/6895 |
| Speed, rpm | 55.0 | 52.0 | 57.0 | 50.7 | 52.3 | 55.0 | 52.0 | 50.7 |
| Injection | | | | | | | | |
| Pressure, psig/kPa | — | 300/2068 | 0/0 | 200/1379 | 0/0 | — | 300/2068 | 200/1379 |
| Pump, rpm | — | 59 | 49 | 52 | 46 | — | 59 | 52 |
| Rate, g/min | — | 11.2 | 11.2 | 11.2 | 11.2 | — | 11.2 | 11.2 |
| Exit Polymer Temperature, °C. | 264 | 264 | 262 | 267 | 267 | 264 | 264 | 267 |
| Filter Pack Type | Screen | Screens | Screen | Screens | Screens | Screens | Screens | Screens |

| Condition | Example | | | | | | | |
|---|---|---|---|---|---|---|---|---|
| | 9 | 10 | 11 | 12 | 13 | 14 | 15 | 16 |
| Extruder | | | | | | | | |
| Temperature, °C. | 260 | 280–293 | 280–294 | 271–288 | 272–288 | 272–287 | 270–289 | 270–290 |
| Pressure, psig/kPa | 1000/6895 | 2400/16548 | 2400/16548 | 2500/17237 | 2500/17237 | 2300/15858 | 2400/16548 | 2100/14479 |
| Speed, rpm | 52.3 | 20 | 20 | 20 | 20 | 20 | 20 | 20 |
| Injection | | | | | | | | |
| Pressure, psig/kPa | 0/0 | — | — | — | — | — | — | — |
| Pump, rpm | 46 | — | — | — | — | — | — | — |
| Rate, g/min | 11.2 | — | — | — | — | — | — | — |
| Exit Polymer Temperature, °C. | 267 | 255 | 255 | 255 | 255 | 255 | 255 | 255 |
| Filter Pack Type | Screens | Screens | Screens | Screens | Screens | Screens | Screens | Screens |

TABLE 3

PHYSICAL YARN PROPERTIES

| Property | Example | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Undrawn Yarn | | | | | | | | | | | | | | | | |
| Denier | 6341 | 6316 | 6381 | 6277 | 6344 | 6341 | 6316 | 6277 | 6344 | — | — | — | — | — | — | — |
| U.E., % | 406 | 491 | 516 | 491 | 514 | 406 | 491 | 491 | 514 | — | — | — | — | — | — | — |
| B.S., g | 7351 | 7462 | 7591 | 7054 | 7687 | 7351 | 7462 | 7054 | 7687 | — | — | — | — | — | — | — |
| $TiO_2$, % | 0.52 | 0.51 | 0.53 | 0.35 | 0.14 | 0.52 | 0.51 | 0.35 | 0.14 | 0.48 | 0.13 | 0.14 | — | 0.40 | 0.44 | 0.41 |
| Drawn Yarn | | | | | | | | | | | | | | | | |
| Denier | 2282 | 2246 | 2296 | 2224 | 2276 | 2332 | 2275 | 2198 | 2213 | 2316 | 2323 | 2348 | 2339 | 2320 | 2288 | 2313 |
| U.E., % | 48 | 39 | 43 | 41 | 46 | 38.5 | 35.4 | 40.9 | 44.8 | 58.9 | 55.5 | 54.2 | 56.6 | 56.1 | 53.4 | 49.0 |
| B.S., g | 8013 | 8014 | 7682 | 7541 | 7918 | 6940 | 7167 | 7983 | 8437 | 7412 | 7096 | 7484 | 7484 | 7348 | 7258 | 6759 |
| Breaks & Wraps per pound | 0.49 | 0.35 | 0.17 | 0.38 | 0.13 | — | — | — | — | — | — | — | — | — | — | — |
| U.T.S., g/d | — | — | — | — | — | 3.0 | 3.2 | 3.6 | 3.8 | 3.2 | 3.1 | 3.2 | 3.2 | 3.2 | 3.2 | 2.9 |

TABLE 4

YARN TEST RESULTS

| Test Xenon Dye Lightfastness (80 hours) | Example | | | | | | |
|---|---|---|---|---|---|---|---|
| | 10 | 11 | 12 | 13 | 14 | 15 | 16 |
| Laurel Crest 3707 | | | | | | | |
| Δ E (Hunter Lab) | 2.4 | 2.5 | 2.0 | 2.6 | 2.3 | 1.9 | 2.0 |
| Colorfastness | 2 | 2–3 | 4 | 4 | 4 | 4 | 4 |
| Laurel Crest 3919 | | | | | | | |
| Δ E (Hunter Lab) | 3.4 | 3.6 | 2.8 | 3.7 | 2.1 | 2.5 | 1.5 |
| Colorfastness | 3–4 | 3–4 | 3–4 | 3 | 4 | 4 | 3–4 |
| Laurel Crest 3805 | | | | | | | |
| Δ E (Hunter Lab) | 3.1 | 2.2 | 1.5 | 1.9 | 1.8 | 1.9 | 1.9 |
| Colorfastness | 2–3 | 3–4 | 4 | 4 | 4–5 | 4 | 4 |

Thus it can be seen that the dispersions and processes of this invention can successfully be used to incorporate additives into polymer without separation and/or flashing problems. The resultant fiber has desirable properties, and this invention makes possible efficient use of equipment and wide diversity of additives useful to make a variety of yarn products.

Although the examples are limited to use of the tetraester of pentaerythritol and the hexaester of dipentaerythritol as carriers, it is believed that other esters of those alcohols would perform suitably as a carrier.

What is claimed is:

1. In a process for melt-spinning yarn from a synthetic fiber-forming polymer, the improvement comprising:

adding to the polymer prior to spinning of filaments of said polymer, a dispersion comprising:
20 to 80 weight percent of at least one polymer additive having an average diameter of up to 0.5 micron at spinning temperature; and 20 to 80 weight percent of a $C_5$–$C_{26}$ fatty acid ester of pentaerythritol.

2. The process of claim 1 wherein the dispersion is added into the polymer at the throat of an extruder.

3. The process of claim 1 wherein the dispersion is added to the polymer when the polymer is molten.

4. The process of claim 3 wherein the dispersion is added to the polymer at the barrel of an extruder.

5. The process of claim 1 wherein the dispersion further comprises about 0.01 to 5.0 percent, based on the weight of the dispersion, of an organic titanate having the general structure:

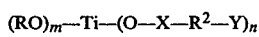

wherein R is monoalkoxy or chelate;

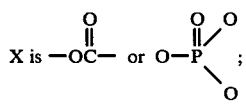

$R^2$ is dioctyl or isoheptadecyl; Y is H; m is 1; and n is 2 or 3.

6. The process of claim 1 wherein the additive is titanium dioxide at up to 2 percent on the weight of the yarn.

7. The process of claim 1 wherein the ester of pentaerythritol is a $C_8$–$C_{10}$ fatty acid tetraester of pentaerythritol.

8. In a process for melt-spinning yarn from a synthetic fiber-forming polymer, the improvement comprising:
adding to the polymer prior to spinning of filaments of said polymer, a dispersion comprising:
20 to 80 weight percent of at least one polymer additive having an average diameter of up to 0.5 micron at spinning temperature; and 20 to 80 weight percent of a $C_5$–$C_{26}$ fatty acid ester of dipentaerythritol.

9. The process of claim 8 wherein the dispersion is added into the polymer when the polymer is in chip form.

10. The process of claim 9 wherein the dispersion is added into the polymer at the throat of an extruder.

11. The process of claim 8 wherein the dispersion is added to the polymer when the polymer is molten.

12. The process of claim 11 wherein the dispersion is added to the polymer at the barrel of an extruder.

13. The process of claim 8 wherein the dispersion further comprises about 0.01 to 5.0 percent, based on the weight of the dispersion, of an organic titanate having the general structure:

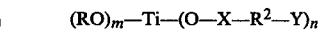

wherein R is monoalkoxy or chelate;

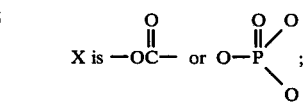

$R^2$ is dioctyl or isoheptadecyl; Y is H; m is 1; and n is 2 or 3.

14. The process of claim 8 wherein the additive is titanium dioxide at up to 2 percent on the weight of the yarn.

15. The process of claim 8 wherein the ester of dipentaerythritol is a $C_5$–$C_{10}$ fatty acid hexaester of dipentaerythritol.

* * * * *